(12) United States Patent
Behr

(10) Patent No.: US 9,083,172 B2
(45) Date of Patent: Jul. 14, 2015

(54) PORTABLE LIGHTNING PROTECTION SYSTEM

(71) Applicant: Lawrence V. Behr, Greenville, NC (US)

(72) Inventor: Lawrence V. Behr, Greenville, NC (US)

(73) Assignee: LBA Group, Inc., Greenville, NC (US)

( * ) Notice: Subject to any disclaimer, the term of this patent is extended or adjusted under 35 U.S.C. 154(b) by 211 days.

(21) Appl. No.: 13/798,665

(22) Filed: Mar. 13, 2013

(65) Prior Publication Data

US 2014/0262410 A1   Sep. 18, 2014

(51) Int. Cl.
| | |
|---|---|
| H02G 13/00 | (2006.01) |
| H02B 1/06 | (2006.01) |
| H02G 1/02 | (2006.01) |
| H02G 7/00 | (2006.01) |
| H01B 3/06 | (2006.01) |
| A43B 7/36 | (2006.01) |
| H01R 4/66 | (2006.01) |

(52) U.S. Cl.
CPC .............. *H02G 13/80* (2013.01); *H02G 13/00* (2013.01); *H02G 13/40* (2013.01)

(58) Field of Classification Search
USPC ....... 174/2, 3, 5 R, 5 SB, 5 SG, 6, 7; 361/117
See application file for complete search history.

(56) References Cited

U.S. PATENT DOCUMENTS

| | | | | |
|---|---|---|---|---|
| 4,447,847 A | * | 5/1984 | Drulard ........................ | 361/117 |
| 5,159,521 A | * | 10/1992 | Guangrun et al. ............ | 361/117 |
| 6,369,317 B1 | * | 4/2002 | Rapp ............................ | 174/5 R |

* cited by examiner

*Primary Examiner* — Hoa C Nguyen
*Assistant Examiner* — Binh Tran
(74) *Attorney, Agent, or Firm* — MacCord Mason PLLC

(57) ABSTRACT

A portable lightning protection system is described for placement adjacent structures requiring lightning protection. The system includes a base mast section with an upper end and a plurality of radially extending, axially aligned ribs; a top mast section; preferably at least one intermediate mast section attachable to the upper end of the base mast section and to the lower end of the top mast section, the mast sections being axially aligned when attached; an air terminal having a conductive rod insertable into the bore of the top mast section; a base including a plurality of radially extending horizontal beams having inner ends attachable to the base mast section ribs and a plurality of inclined beams having inner ends attachable to the base mast section ribs and outer ends attachable to the horizontal beams; and grounding cables connecting the mast to the ground.

18 Claims, 2 Drawing Sheets

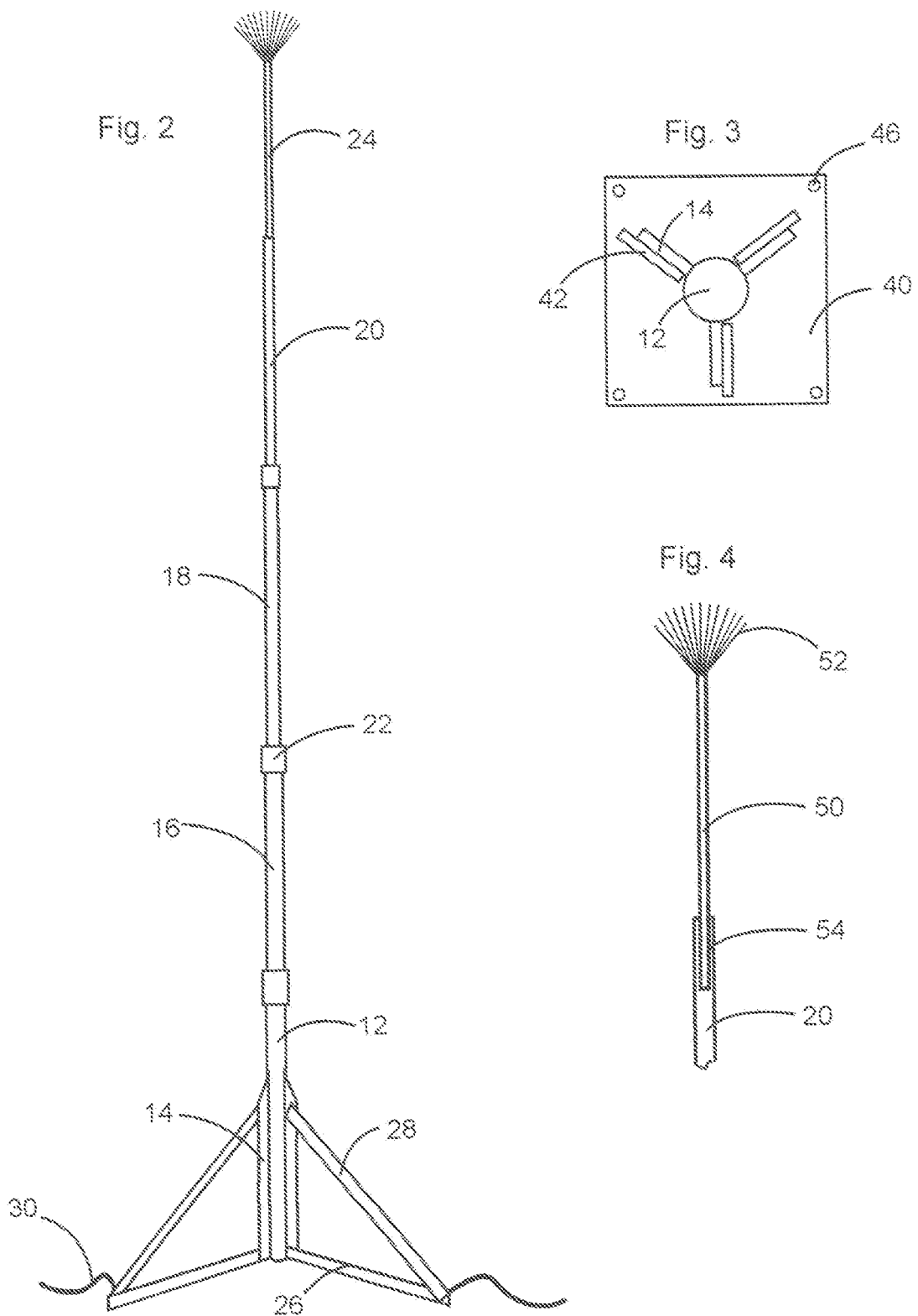

PORTABLE LIGHTNING PROTECTION SYSTEM

BACKGROUND OF THE INVENTION (1) Field of the Invention

The present invention relates to a system for providing lightning protection to remote and temporary locations, and in particular, to a portable system that can be readily assembled for mounting adjacent a structure or location to be protected from lightning.

(2) Description of the Prior Art

Lightning terminals or "lightning rods" are commonly attached to numerous structures such as cell towers, drilling rigs, and tanks. Generally, these terminals are attached to the highest part of the structure and grounded. Lightning will strike the terminal instead of the structure and follows the least path of resistance to the ground.

However, many portable and high value assets are not protected from lightning strikes. Such assets include portable buildings, vehicle, pumping stations, emergency and military command posts, solar cell and satellite dish installations, environmental monitoring facilities, etc. Thus, there is a need for a lightning protection system that can be installed adjacent such assets to provide protection from lightning strikes, and in particular for a lightning protection system that is portable and easy to install, while providing a zone of protection.

SUMMARY OF THE INVENTION

The present invention addresses this need by providing a portable lightning protection system that can be quickly and easily installed adjacent a structure to be protected, while providing a zone of protection over the structure.

Generally, the system of the present invention is comprised of a multi-section mast, an air terminal, a base for supporting the mast in a vertical orientation, and mast grounding. The system may also include a bag for convenient storage and transportation. A guy kit may also be included with taller versions of the mast.

More specifically, the mast is comprised of multiple tubular aluminum mast sections. The sections include a top section with an upper end adapted to receive the air terminal, a base section adapted for connection to the mast base, and in most configurations, one or more intermediate mast sections for attachment between the top and base sections.

The mast sections are joined together by threaded couplings. In a preferred embodiment, a coupling in the form of an internally threaded sleeve is positioned around the section tube and spaced from the lower end of the tube so that a length of tube extends beneath the coupling. The sections are sized to be telescoping so that the lower end of a section is inserted into the top of another section. The upper ends of the base and intermediate sections are threaded for attachment to the coupling. To join sections, the lower end of one section is inserted into the upper end of the other section, and the coupling is threaded onto the top of the other section. This combination of telescoped sections and threaded attachment with the coupling provides a secure and conductive joinder particularly suited to the purpose of the invention.

The mast preferably includes two or three intermediate mast sections of from 5 to 10 ft. depending on the desired height of the mast. The base section will have a length of 3 to 6 and the top section will have a length of 5 to 10 ft. Generally, the mast, including the top and base mast sections will have a height of 14 to 38 ft.

The top mast section includes an axial bore extending downwardly from its top end. The air terminal in the preferred embodiment is comprised of a conductive rod. e.g., a copper, aluminum or stainless steel rod, sized for snug insertion into the bore. A plurality of thin wires, e.g. 10 to 200 wires, project upwardly and outwardly from the top end of the air terminal rod in the shape of a brush to dissipate electrical charge. The "brush" is of the type commonly used as a part of a spot dissipater, which also includes a short length of rod or tubing to attach the brush to structures such as antennas, flag poles, storage tanks, etc. It will be understood that other air terminals can be used in the present invention.

The base mast section is adapted for attachment to one or more types of bases. Generally, the base mast section is an aluminum tube with a plurality, e.g., three, radially extending ribs that are longitudinally aligned with the tube. The ribs include holes for attaching the base.

One type of mast base, referred to herein as a portable base, is comprised of horizontal beams attached to the lower ends of the base mast section ribs and extending radially outwardly from the base mast section, and inclined bracing beams extending from the tops of the ribs outwardly to the distal ends of the attached horizontal beams. The inner ends of the horizontal and bracing beams may be bolted to the fins and to each other at their outer ends. The beams may conveniently be constructed of L-shaped aluminum bars. The portable base may be secured to the ground with anchor rods attached to the distal ends of the horizontal beams and pushed into the ground, or sandbags may be placed on the horizontal beams.

Another base, referred to herein as a fixed base mount, is comprised of a flat, preferably square horizontal plate with holes in each corner for bolting the plate to a solid surface such as concrete. The bolts may be first embedded in the concrete. Vertical attachment plates extend upwardly from the upper surface of the plate for attachment to the ribs of the base mast section.

In addition to the above components, the protection system includes at least one grounding cable so that lightning has a pathway into the ground from the mast. The conductive grounding cable has one end attached near the bottom of the mast, e.g. to a connection point between the base mast section and the base, and the other end attached to the top of the ground rod, which is inserted into the ground. Preferably, a plurality of grounding cables and rods are used, with one cable being attached at each connection of the base mast section and the base. Thus, a system having a base mast section with three ribs would also have three grounding cables.

In use, the mast sections are assembled, the air terminal is inserted into the top of the top mast section and the base mast section is secured to the portable or fixed base, which is located near, but separate from, the structure to be protected from lightning. The grounding cables are then attached to the system and to ground rods. The assembled system provides a zone of protection, preventing lightning from striking structures within the zone.

BRIEF DESCRIPTION OF THE DRAWINGS

FIG. 2 is side view of the assembled lightning protection system.

FIG. 3 is a top view of an alternative base.

FIG. 4 is a detailed side view of the air terminal.

DETAILED DESCRIPTION OF THE INVENTION

In the following description, terms such as horizontal, upright, vertical, above, below, beneath, and the like, are used solely for the purpose of clarity in illustrating the invention, and should not be taken as words of limitation. The drawings are for the purpose of illustrating the invention and are not intended to be to scale.

Figure 1:
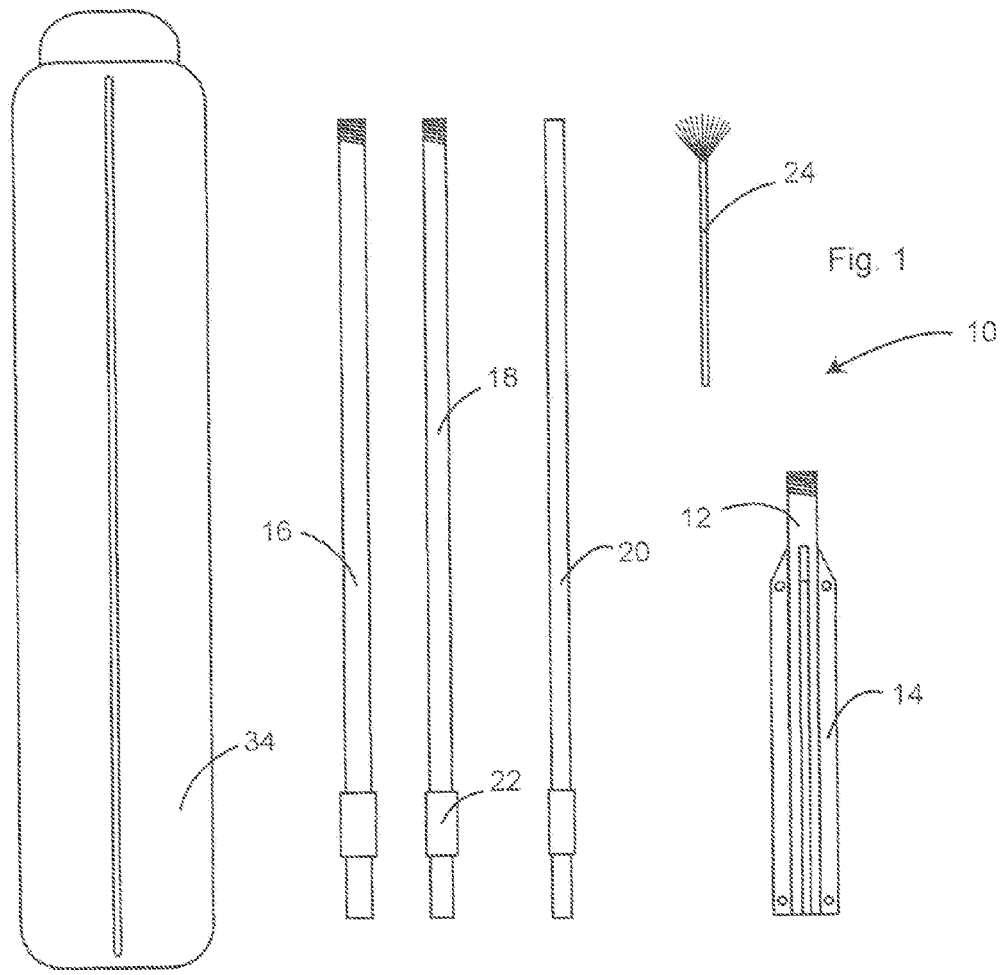
FIG. 1 is a side view of the components of the lightning protection system.
Figure 1:
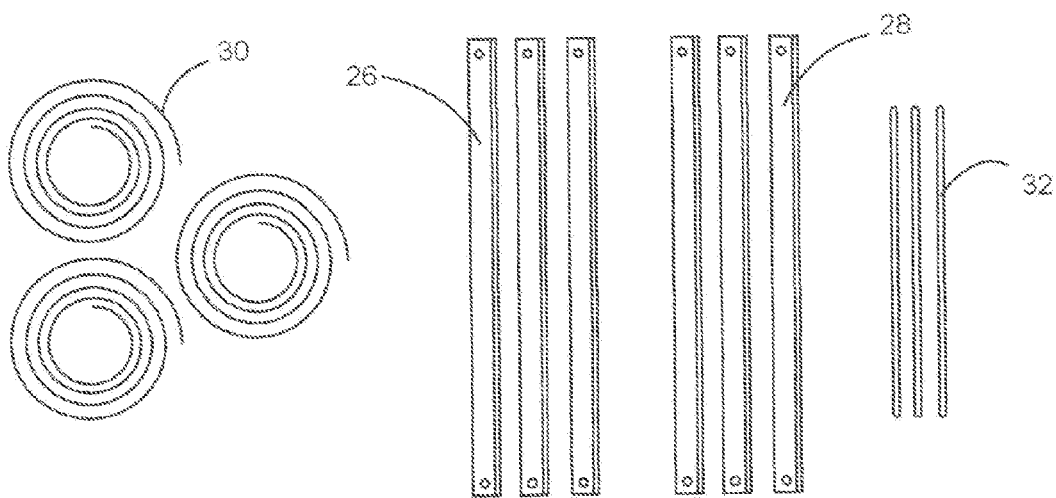

As illustrated in FIGS. 1 and 2, a preferred embodiment of the lightning protection system, generally 10, which may be sold as a kit, includes a base mast section 12, which includes three radially projecting fins 14; two intermediate mast sections 16 and 18; and a top mast section 20. Sections 16, 18 and 20 include threaded coupling 22 near their lower ends to be screwed onto the tops of sections 12, 16 and 18, respectively.

System 10 also includes an air terminal 24. As illustrated in detail in FIG. 4, air terminal 24 includes a conductive rod 50 that is inserted into bore 54 in the upper end of section 20, and a brush 52 comprised of a plurality of fine conductive wires.

System 10 also includes ground wires 30 that connect the system base to ground rods 32 that are driven into the ground. A carry bag 34 is also provided for convenient storage and transport of the other components.

An alternative base illustrated in FIG. 3 is comprised of a flat plate 40 that has three vertical attachment plates 42 positioned to be bolted to fins 14 of base mast section 12.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A portable lightning protection system for placement adjacent structures requiring lightning protection, said system comprising:
    a) a multi-section conductive mast including a base mast section, and a top mast section;
    b) an air terminal attachable to the top mast section;
    c) a base attachable to the base mast section; and
    d) at least one grounding cable to ground the mast,
    e) wherein said base includes a plurality of radially extending horizontal beams having inner ends attachable to said base mast section and a plurality of inclined beams having inner ends attachable to said base mast section and outer ends attachable to said horizontal beams.

2. The system of claim 1, further including at least one intermediate mast section.

3. The system of claim 1, wherein said top mast section includes an upper end with an axial bore, said air terminal having a conductive rod insertable into said bore.

4. The system of claim 1, wherein said base mast section includes a plurality of radially extending ribs for attachment to said base.

5. The system of claim 1, wherein said base is comprised of a horizontal plate with an upper surface and attachment plates extending upward from said upper surface for attachment to said base mast section.

6. The system of claim 1, wherein said air terminal is comprised of a conductive rod having an upper end and a wire brush attached to the upper end of said rod.

7. The system of claim 1, further including two intermediate mast sections.

8. The system of claim 1, further including a carrying bag sized to hold the other components of said system.

9. A portable lightning protection system for placement adjacent structures requiring lightning protection, said system comprising:
    a) a base mast section with an upper end and a plurality of radially extending, axially aligned ribs;
    b) a top mast section with a lower end and an upper end having an axial bore;
    c) at least one intermediate mast section having a lower end attachable to the upper end of said base mast section, and an upper end attachable to the lower end of said top mast section, said mast sections being axially aligned when attached;
    d) an air terminal having a conductive rod insertable into the bore of said top mast section, said rod being in axial alignment with said top mast section;
    e) a base attachable to said base mast section; and
    f) grounding cables connecting the mast to the ground,
    g) wherein said base includes a plurality of radially extending horizontal beams having inner ends attachable to said base mast section ribs and a plurality of inclined beams having inner ends attachable to said base mast section ribs and outer ends attachable to said horizontal beams.

10. The system of claim 9, wherein said base is comprised of a horizontal plate with an upper surface and attachment plates extending upward from said upper surface for attachment to said base mast section ribs.

11. The system of claim 9, including an upper intermediate mast section and a lower intermediate mast section.

12. The system of claim 9, further including ground rods to ground said cables to the earth.

13. The system of claim 9, wherein said at least one intermediate section and said base mast section are joined by a threaded coupling with the lower end of the intermediate section extending into the base mast section.

14. The system of claim 9, further including a carrying bag sized to hold the other components of said system.

15. A portable lightning protection system for placement adjacent structures requiring lightning protection, said system comprising:
    a) a base mast section with an upper end and a plurality of radially extending, axially aligned ribs;
    b) a top mast section with a lower end and an upper end having an axial bore;
    c) at least one intermediate mast section having a lower end attachable to the upper end of said base mast section, and an upper end attachable to the lower end of said top mast section, said mast sections being axially aligned when attached,
    d) an air terminal having a conductive rod insertable into the bore of said top mast section, said rod being in axial alignment with said top mast section;
    e) a base including a plurality of radially extending horizontal beams having inner ends attachable to said base mast section ribs and a plurality of inclined beams having inner ends attachable to said base mast section ribs and outer ends attachable to said horizontal beams; and
    f) grounding cables connecting the mast to the ground.

16. The system of claim 15, including two intermediate mast sections.

17. The system of claim 15, wherein said mast sections are joined by threaded couplings with the lower ends of the top and intermediate sections telescoping into the tops of another mast sections.

18. The system of claim 15, further including a carrying bag sized to hold the other components of said system.

* * * * *